US012699380B2

(12) United States Patent
Srinivasan et al.

(10) Patent No.: US 12,699,380 B2
(45) Date of Patent: Aug. 4, 2026

(54) DATA TRANSMISSION THROUGH A UNIDIRECTIONAL GATEWAY

(71) Applicant: HONEYWELL INTERNATIONAL INC., Charlotte, NC (US)

(72) Inventors: Srikant Srinivasan, Bangalore (IN); Senthilkumar Kumarasamy, Krishnagiri (IN); Karthick Manoharan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 440 days.

(21) Appl. No.: 18/202,977

(22) Filed: May 29, 2023

(65) Prior Publication Data

US 2024/0402688 A1 Dec. 5, 2024

(51) Int. Cl.
*G05B 19/418* (2006.01)
(52) U.S. Cl.
CPC ................................ *G05B 19/4186* (2013.01)
(58) Field of Classification Search
CPC ...... G05B 19/4186; G05B 2219/34263; G05B 19/418
USPC ........................................................ 707/609
See application file for complete search history.

(56) References Cited

U.S. PATENT DOCUMENTS

| | | | |
|---|---|---|---|
| 2010/0275139 A1* | 10/2010 | Hammack .......... | G05B 19/0426 |
| | | | 715/763 |
| 2019/0187689 A1* | 6/2019 | Cella ...................... | G06N 5/046 |
| 2020/0404014 A1* | 12/2020 | Pfleger De Aguiar | ...................... |
| | | | H04L 63/1408 |
| 2023/0185370 A1* | 6/2023 | Fujiwara .............. | H04N 23/611 |
| | | | 348/78 |
| 2023/0419339 A1* | 12/2023 | Chakraborty ...... | G06Q 30/0269 |

* cited by examiner

*Primary Examiner* — Kuen S Lu
(74) *Attorney, Agent, or Firm* — Alston & Bird LLP

(57) ABSTRACT

Approaches for managing alarms and alarm system performance in an industrial system are described. The industrial system may include an operation technology network (OTN) which may be communicatively coupled to an information technology network (ITN) through a unidirectional gateway which allows data transfer from the OTN to ITN, but not vice versa. The approaches as described enable transmission of event data pertaining to events or operations that may be underway in the factory site where the industrial system is installed. In addition, the present approaches also enable collection and transmission of attribute data pertaining to one or more operational parameters of control systems (DCS, SIS, PLC's, SCADA), to the ITN. The event data and the attribute data may then be processed by any module(s) that may be implemented within the ITN to generate various event related insights and insights into metrics of the alarm management system or other systems present within the OTN.

8 Claims, 10 Drawing Sheets

COLLECTING, FROM A DATA COLLECTION UNIT, ATTRIBUTE DATA PERTAINING TO OPERATIONAL PARAMETERS OF A PLURALITY OF CONTROL SYSTEMS IN AN OPERATIONAL TECHNOLOGY NETWORK OF AN INDUSTRIAL CONTROL SYSTEM, WHEREIN THE OPERATIONAL TECHNOLOGY NETWORK IS COMMUNICATIVELY COUPLED TO AN INFORMATION TECHNOLOGY NETWORK TRHOUGH A UNIDIRECTIONAL GATEWAY 702

STORING THE COLLECTED ATTRIBUTE DATA AS A BATCH ATTRIBUTE DATA 704

GENERATING AN ATTRIBUTE FILE BASED ON THE BATCH ATTRIBUTE DATA, WHEREIN THE ATTRIBUTE FILE COMPRISES THE ATTRIBUTE DATA CORRESPONDING TO EACH OF THE PLURALITY OF CONTROL SYSTEM IN A STRUCTURED FORMAT 706

TRANSMITTING THE ATTRIBUTE FILE THROUGH THE UNIDIRECTIONAL GATEWAY TO THE INFORMATION TECHNOLOGY NETWORK 708

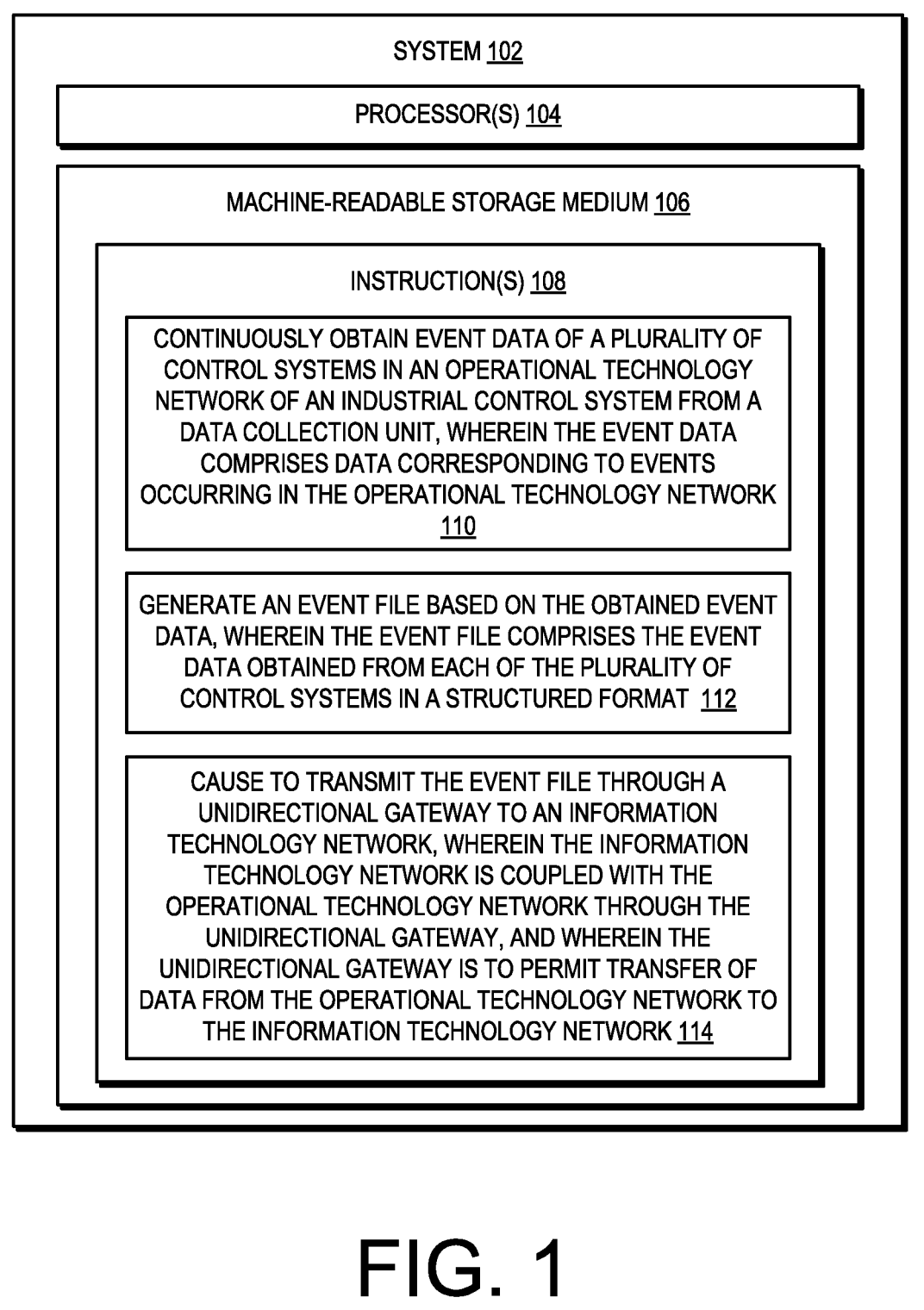

SYSTEM 102

PROCESSOR(S) 104

MACHINE-READABLE STORAGE MEDIUM 106

INSTRUCTION(S) 108

CONTINUOUSLY OBTAIN EVENT DATA OF A PLURALITY OF CONTROL SYSTEMS IN AN OPERATIONAL TECHNOLOGY NETWORK OF AN INDUSTRIAL CONTROL SYSTEM FROM A DATA COLLECTION UNIT, WHEREIN THE EVENT DATA COMPRISES DATA CORRESPONDING TO EVENTS OCCURRING IN THE OPERATIONAL TECHNOLOGY NETWORK 110

GENERATE AN EVENT FILE BASED ON THE OBTAINED EVENT DATA, WHEREIN THE EVENT FILE COMPRISES THE EVENT DATA OBTAINED FROM EACH OF THE PLURALITY OF CONTROL SYSTEMS IN A STRUCTURED FORMAT 112

CAUSE TO TRANSMIT THE EVENT FILE THROUGH A UNIDIRECTIONAL GATEWAY TO AN INFORMATION TECHNOLOGY NETWORK, WHEREIN THE INFORMATION TECHNOLOGY NETWORK IS COUPLED WITH THE OPERATIONAL TECHNOLOGY NETWORK THROUGH THE UNIDIRECTIONAL GATEWAY, AND WHEREIN THE UNIDIRECTIONAL GATEWAY IS TO PERMIT TRANSFER OF DATA FROM THE OPERATIONAL TECHNOLOGY NETWORK TO THE INFORMATION TECHNOLOGY NETWORK 114

FIG. 1

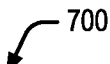

700

COLLECTING, FROM A DATA COLLECTION UNIT, ATTRIBUTE DATA PERTAINING TO OPERATIONAL PARAMETERS OF A PLURALITY OF CONTROL SYSTEMS IN AN OPERATIONAL TECHNOLOGY NETWORK OF AN INDUSTRIAL CONTROL SYSTEM, WHEREIN THE OPERATIONAL TECHNOLOGY NETWORK IS COMMUNICATIVELY COUPLED TO AN INFORMATION TECHNOLOGY NETWORK TRHOUGH A UNIDIRECTIONAL GATEWAY 702

STORING THE COLLECTED ATTRIBUTE DATA AS A BATCH ATTRIBUTE DATA 704

GENERATING AN ATTRIBUTE FILE BASED ON THE BATCH ATTRIBUTE DATA, WHEREIN THE ATTRIBUTE FILE COMPRISES THE ATTRIBUTE DATA CORRESPONDING TO EACH OF THE PLURALITY OF CONTROL SYSTEM IN A STRUCTURED FORMAT 706

TRANSMITTING THE ATTRIBUTE FILE THROUGH THE UNIDIRECTIONAL GATEWAY TO THE INFORMATION TECHNOLOGY NETWORK 708

FIG. 7

DATA TRANSMISSION THROUGH A UNIDIRECTIONAL GATEWAY

BACKGROUND

Industrial processes, such as manufacturing, product handling, production, distribution, and such, may involve managing and streamlining operation of a variety of systems, such as pumps, valves, vessels, filters, coolers, and piping. To ensure that the industrial processes operate in a performant manner, information systems, referred to as industrial control systems may be used to control such industrial processes. Industrial control systems include supervisory, Safety Instrumented Systems (SIS), control and data acquisition systems which may either monitor or geographically dispersed assets, distributed control systems or smaller control systems using programmable logic to control such processes.

BRIEF DESCRIPTION OF FIGURES

Systems and/or methods, in accordance with examples of the present subject matter are now described and with reference to the accompanying figures, in which:

FIG. 1 illustrates a system for managing, monitoring and assessing alarms and events in an industrial control system, as per an example;

FIG. 7 illustrates a method for managing, monitoring and assessing alarms and events in an industrial control system, as per an example;

DETAILED DESCRIPTION

Figure 2:
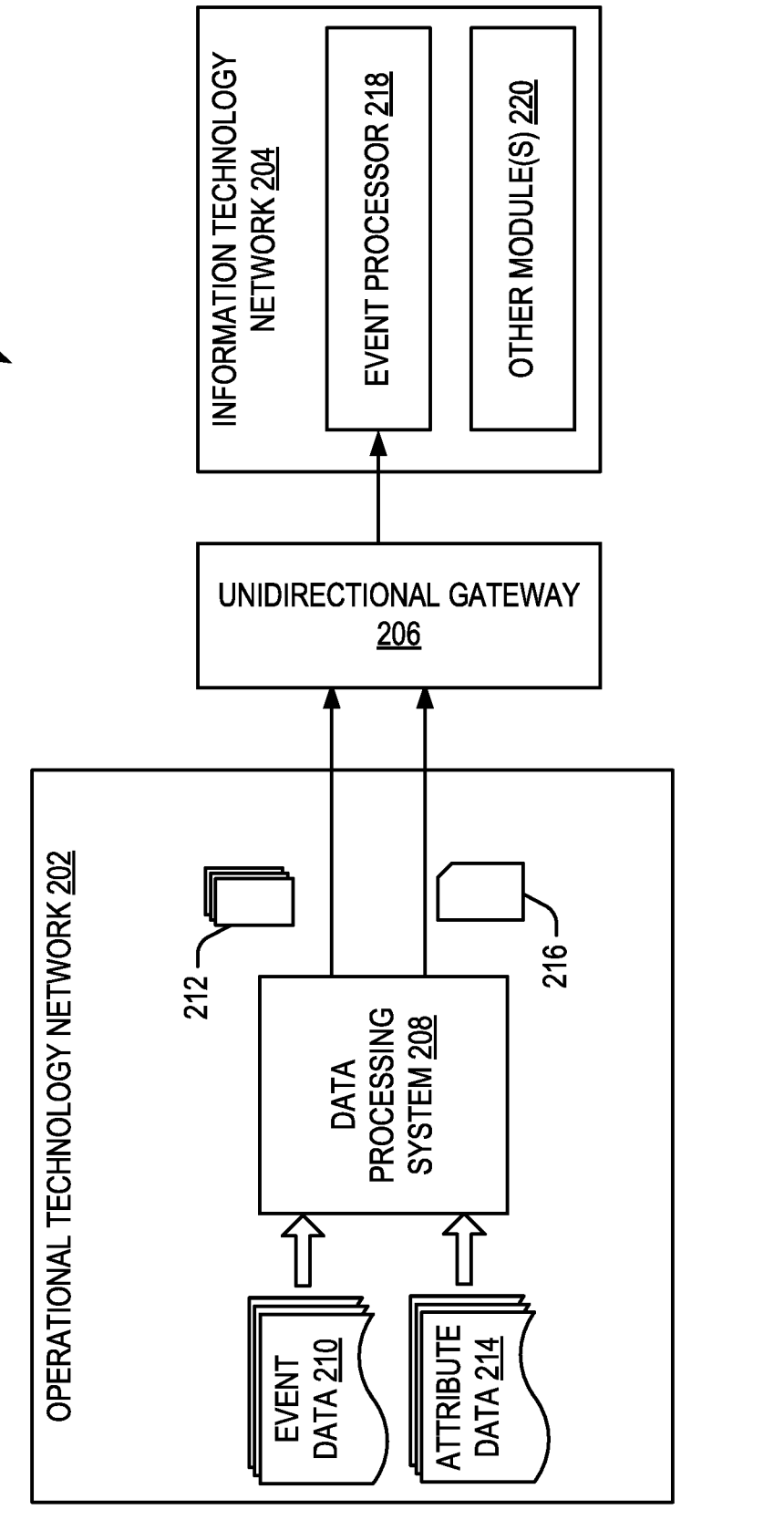
FIG. 2 illustrates an industrial control system within any industrial facility implementing an industrial process, as per an example.

Industrial processes being implemented using industrial control systems may involve monitoring, managing, and streamlining operations of a variety of systems in one or more facilities. Within the facilities, the operation of the various systems may be monitored through alarms and events. An alarm management system is utilized to monitor various events pertaining to different industrial processes. Any deviation from an otherwise performant operation or well-defined operational limits is detected, and accordingly notified by the alarm system as a visual or aural indication for operators. The operators may then take actions to prevent or mitigate potential consequences that may follow as a result of the deviation. In other instances, the alarm management systems may also initiate one or more automated processes so as to control systems which may not have been functioning properly. The alarm systems reduce the risk of harmful situations that may result in undesired consequences such as fire, explosion, or toxic release.

Operationally, an alarm management monitoring system enables quick identification of alarms and operational issues and may be used for benchmarking alarm system performance against applicable industry standards. In such instances, alarms, events, and attribute data pertaining to one or more operational parameters or state of distributed control systems and/or process safety systems may be collected and continuously processed for assessment, review, validation and analysis. This may not only be useful for purposes of compliances but to also improve the alarm systems performance and reducing load on the operator. The automated continuous collection and processing may reduce time and effort that may be involved for performing such assessment, review, validation and analysis activities.

Involvement of such systems requires continuous monitoring and collection of related data pertaining to different events that may occur during a process. Such events may correspond to operations which in turn, may be performed by different components installed within a facility. In an example, the facility may include several field sensors positioned at appropriate locations for capturing occurrence of events in the facility and corresponding data representing occurrence of events may be generated by a distributed control system. The data thus captured may pertain to alarms and/or events. Thereafter, the captured data may be transferred to a data collector and processing system via the distributed control system installed within a process control network for further processing.

As mentioned previously, the industrial processes may be controlled by information systems, referred to as industrial control systems. Generally, an industrial system may comprise two physical networks—an operational technology network (OTN) also referred to as the process control network (PCN) and the informational technology network (ITN) or business network (BN). The OTN includes programmable systems or devices that may interact with physical environments or may manage devices that interact with the physical environments. Such systems/devices detect or cause a direct change through the monitoring and/or control of devices, processes, and events. The control systems in turn may further include a collection of devices, systems, networks, and controls. Within the OTN is where most of the Distributed Control Systems (DCS), SIS (Safety Instrumented Systems), PLCs, and/or field devices may be deployed. Examples include building management systems, fire control systems, and physical access control mechanisms.

The events data and status information from various control systems may be collected and shared to other data processing units which are either installed within the OTN or other remote networks, such as information technology (IT) networks. For the latter case, the OTN includes a communication gateway which provides communication to a remote network such as the ITN.

The access to the OTN may be separated from the ITN through the gateway to prevent lateral data movement between ITN and the OTN for sake of security. Examples of such a gateway include firewalls and proxies. Owing to security threats to which firewalls and proxies may be exposed to, the gateway may be implemented using a unidirectional gateway. Unidirectional gateways, such as data diodes, allow data transfer from the OTN to the ITN but restrict any transfer of data from the ITN to the OTN. As such, a unidirectional gateway, such as a data diode, is capable of concealing various access related parameters or network information (e.g., IP or MAC addresses) of the systems within the OTN. Since such information is not available, any communication or access with systems within OTN is not possible. In such a case, any system functioning within the ITN will not be able to access or communicate with any other system within the OTN. The data diodes may be implemented using fiber-optic network link.

Growing business needs have resulted in enterprise level alarm management which involves implementing a variety of alarm management solutions and features in the ITN. Implementation in the ITN enables better collaboration across resources, experts or other stake holders that may be available not only at the location of the facility but available at other locations. Implementing the above in topologies which use unidirectional gateways is challenging for a number of reasons. For example, such topologies do not support typical communication protocols such as Transmission Control Protocol/Internet Protocol (TCP/IP) or Hyper-Text Transfer Protocol (HTTP). In addition, such implementations also tend to increase the complexity in efficient and continuous collection of data and may also reduce the timely availability of data across different remote networks. Therefore, there is a need for approaches which allow continuous, timely and robust transmission of data in a topology in which different networks are interconnected using the unidirectional gateway.

Approaches for managing alarms in an industrial control system are described. The alarms may be managed through an alarm management system implemented within the industrial system. The industrial system may include an operation technology network or OTN (interchangeably referred to as a process control network). The OTN may be communicatively coupled to an information technology network or ITN (interchangeably referred to as business network) through a unidirectional gateway. The unidirectional gateway is so implemented such that it is to allow data transfer in one direction only (from the OTN to ITN), but not vice versa. The approaches as described enable transmission of alarms, events data pertaining to events or operations that may be underway. In addition, the present approaches also enable collection and transmission of attribute data pertaining to one or more operational parameters or state of distributed control systems and/or process safety systems, to the ITN. The event data and the attribute data may then be processed by one (or more) module(s) that may be implemented within the ITN. Once processed, various insights into the current events that may be occurring within the OTN may be obtained. In a similar manner, insights into metrics of the alarm management system or other systems present within the OTN which aid in assessment, review, analysis, and diagnosis of the alarm system and its performance.

In operation, a system for collecting and subsequently processing event data and attribute data, is implemented within the OTN. In an example, the system may continuously obtain event data in real time from a distributed control system within the OTN. The event data may be collected from a plurality of field sensors installed for monitoring an industrial process. The event data is such that it may be in different formats depending on the source and the communication protocol through which the event data may have been collected. Examples of such different communication protocols include, but are not limited to, OPC alarm & event (OPC AE), OPC unified architecture alarms and conditions (OPC UA ACs), open database connectivity (ODBC), transmission control protocol/internet protocol (TCP/IP), serial communication protocol, and file transfer protocol.

Returning to the present example, the event data is collected and processed to generate one or more event files. In an example, the event file is generated in a chronological order. The event file thus generated may then be transmitted to the ITN through the unidirectional gateway. The size of the event file that is generated may be configurable. For example, the event file may be generated based on a predefined logic. Example of such logic includes generating the event files of certain specified size. In such a case, the predefined logic may result in generation of the event file once volume data collected exceeds a predefined level. In another example, the event file may be generated at specified instances or intervals, such as every minute. It may be noted that these implementations are only exemplary. Any other logic may also be used without deviating from the scope of the present subject matter. In the same manner as described above, subsequently collected event data may be used for generating a subsequent event file. As may be noted, the event file and the subsequent event file may be processed chronologically.

In an example, the event file is of a format which may be processed within the ITN. An example of the format of the event file includes, but is not limited to, a text file or JavaScript Object Notation (JSON). It may be noted that the aforesaid format types are only indicative—any other format through which structured data may be represented may also be used without deviating from the scope of the present subject matter. The event file once received may be further processed by the ITN for implementing desired alarm management solutions and features in the ITN.

It is pertinent to note that for effective alarm management, collection of the event data may not be sufficient. In an example, attribute data pertaining to one or more operational parameters or state of distributed control systems and/or process safety systems within the OTN may need to be collected/obtained on periodic basis. The attribute data thus collected may correspond to one or more metrics pertaining to the health or performance of distributed control systems and/or process safety systems within the OTN for a specific time interval. Examples of such metrics include alarm conditions that may be active, active alarm conditions that are shelved, a current shelving status of different alarm conditions, current suppression status of different alarm conditions, and suppression status of different tags and alarm conditions. Attribute data pertaining to other metrics may also be collected without any limitation. It may be noted that such different data pertaining to different metrics are processed together as a batch.

Continuing further, as the attribute data is collected periodically (as a batch), it may be stored in a buffer. On conforming to a predefined condition (like completion of batch), the attribute data collected in the buffer is retrieved and processed to generate an attribute file. It may be noted that a batch may be considered as complete when all values of the prescribed metrics have been obtained. The attribute file thus generated includes all information pertaining to various metrics of the distributed control systems and/or process safety systems within the OTN for a specific time period or interval. Once the attribute file is generated, the same may be communicated to the ITN through the unidirectional gateway. The attribute file may then be processed by the ITN to provide insights into various metrics pertaining to the alarm system performance of the distributed control systems and/or process safety systems within the OTN. As described previously, the attribute file may be generated periodically based on the frequency set in the collection systems (example once after a predefined number of hours, days, etc.) or the batch of the attribute data is complete. (E In an example, the attribute file may be processed to provide insights which in turn may be used to review alarm system performance of the distributed control systems and/or process safety systems within the OTN. For example, such reviews or validations may be performed for compliances.

The above approaches enable transmission of not only event data but also attribute data from the OTN to the ITN through the unidirectional gateway. Since the event data is collected in real time, the event file is also generated continuously allowing updated insights into events in near-real time basis for monitoring assessment, review, analysis, diagnosis of the alarm system performance. Furthermore, the present approaches are not limited by the different formats and sources through which the event data was collected. In addition, the present approaches also allow for monitoring, reviewing, and validating the alarm system performance and metrics of the distributed control systems and/or process safety systems within the OTN based on the periodic collection of the attribute data.

FIG. 1 illustrates system 102 for managing alarms in an industrial control system, as per one example. The system 102, as will be explained further, may generate event files based on event data captured by a plurality of control systems like DCS, SIS, PLC, etc., of an industrial I system. The industrial system may include an operational technology network (OTN) and an information technology network (ITN). In an example, the event data is received from a data collection unit installed in an OTN. The system 102 includes a processor 104 and a machine-readable storage medium 106 which is coupled to, and accessible by, the processor 104. The system 102 may be implemented in any computing system, such as a storage array, server, desktop or a laptop computing device, a distributed computing system, or the like. Although not depicted, the system 102 may include other components, such as interfaces to communicate over the network or with external storage or computing devices, display, input/output interfaces, operating systems, applications, data, and other software or hardware components (all of which have not been depicted).

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include non-transitory computer-readable medium including, for example, volatile memory such as RAM (Random Access Memory), or non-volatile memory such as EPROM (Erasable Programmable Read Only Memory), flash memory, and the like. The instructions 108 may be executed to classify the hardware components of the computing device.

In an example, the processor 104 may fetch and execute instructions 108. In one example, as a result of the execution of the instructions 110, the system 102 may continuously obtain event data of the plurality of control systems (such as DCS, SIS, PLC's, and the like) from a data collection unit. The event data includes data corresponding to events which occur within industrial facilities being managed and monitored by the industrial control systems. In the context of the present subject matter, an event may be considered as occurrences or changes in a particular set of circumstances or parameters that are being monitored by the plurality of control systems. Such occurrences or changes are observable and may have an impact on one or more industrial processes implemented within the industrial facility. Few examples of such changes include changes in temperature, pressure, flow, level, electric current, and such other parameters. In an example, the event data may be obtained from different control systems through different channels of a data collection unit. Such channels may enable communication of event data through different communication protocols, for example, OPC alarm & event (OPC AE), OPC unified architecture alarms and conditions (OPC UA AC), open database connectivity (ODBC), transmission control protocol/internet protocol (TCP/IP), serial communication protocol, and file transfer protocol.

Once obtained, the instructions 112 may be executed to generate event files based on the event data received from the plurality of control systems. The generated event files comprise the event data obtained from each of the plurality of control systems in a structured format. In an example, the event data may be structured in a chronological order and may be in different formats. The event files may be generated based on a predefined time interval, or when the volume of the events data exceeds a predefined threshold. Examples of format of the event file includes, but is not limited to, a text file, JavaScript Object Notation (JSON) file or any other format through which structured data may be represented.

Once the event file is generated, the instructions 114 may be executed to cause transmission of the event file through a unidirectional gateway to the information technology network, i.e., the ITN. In an example, the ITN may process the event files to enable assessment, analysis, review, and diagnosis of the alarm system performance within the OTN.

The above functionalities performed as a result of the execution of the instructions 108, may be performed by different programmable entities. Such programmable entities may be implemented through any computing systems, which may be implemented either on a single computing device, or multiple computing devices. As will be explained, various examples of the present subject matter are described in the context of a computing system which obtain event related data and other data, such as attribute data, to generate a corresponding files to be transmitted to ITN, and thereafter, utilized by the ITN for enabling the assessment, analysis, review or diagnosis of the alarm system performance of the control systems (like DCS, SIS, PLC's) in the industrial system. These and other examples are further described with respect to the remaining figures.

FIG. 2 illustrates an industrial system 200 within any industrial facility implementing an industrial process. The industrial system 200 (referred to as the system 200) may include control systems like DCS, SIS, PLC, or the like which monitor the various industrial processes to ensure that any observable occurrence, if found to be deviating from expected operating conditions, is notified, and addressed. Examples of industrial facilities which contains the system 200 may include, but is not limited to, pharmaceutical manufacturing plant, refining and petrochemicals plants, oil and gas processing plants, metal manufacturing plant, or any other facility that may be engaged in manufacturing or processing. In an example, the system 200 includes an operational technology network (OTN) 202 and an information technology network (ITN) 204 which are connected to each other using a unidirectional gateway 206. The unidirectional gateway 206 permits the transfer of data from the OTN 202 to the ITN 204 but restricts transmission of any data from the ITN 204 to the OTN 202. As such, unidirectional gateway 206, such as a data diode, is capable of concealing various access related parameters or network information (e.g., IP or MAC addresses) of the systems within the OTN 202. Since such information is not available, any communication or access with systems within OTN 202 is not possible. In such a case, any system functioning within the ITN 204 will not be able to access or communicate with any other system within the OTN 202. In an example, the OTN 202 may use file transfer protocol (FTP) for transmitting the event file(s) 212 through the unidirectional gateway 206 to the ITN 204.

The OTN 202 includes combination of software and hardware components which process and use operational data, such as telecommunication data, technical components data, and computers data, to monitor and implement appropriate actions for various events occurring in the industry. Such software and hardware components of the OTN 202 may detect or cause a direct change through the monitoring and/or control of devices, processes, and events. In an example, the OTN 202 may include plurality of distributed control systems (DCS), SIS, PLCs, and/or field sensors that monitor, that may create events and effect appropriate actions that may have to be undertaken based on the monitoring. In an example, the OTN 202 may include a data processing system 208. The data processing system 208 may process event data 210 and attribute data 214 to provide event file(s) 212 and an attribute file 216, which are then transmitted to the ITN 204 through the unidirectional gateway 206.

The ITN 204 includes systems implementing a variety of primary business functions of an organization. In addition to implementing the business functions, the systems within the ITN 204 may also be used for assessment, analysis, review, or diagnosis of the alarm system performance of the distributed control systems, PLC's and/or process safety systems (SIS) (not shown in FIG. 2) within the system 200. The aforementioned functions may be implemented as a combination of hardware and programming. In an example, the ITN 204 comprises an event processor 218 and other module(s) 220. The event processor 218 may be any feature implemented by way of executable instructions that may be used to process the event file(s) 212 or the attribute file 216. For example, the event processor 218 may be such that it may, upon processing the event file(s) 212, provide features, such as alarm information in near real time.

As may be appreciated, intimation of alarms in the ITN 204 need not be immediate since any action based on the alarm information is anyways handled by operators that may be present and monitoring systems within the OTN 202. In another example, the event processor 218 may perform an analysis of alarms that may have been triggered within a certain time period. In yet another example, the event processor 218 may further process the attribute file 216 to determine the status of different alarms or tags (i.e., whether they are active, suppressed, shelved or inactive, etc.) implemented within the system 200. In this manner, the event processor 218 may be configured depending on the nature of analysis that is to be performed on either the event data 210, the attribute data 214, or both to aid the assessment, analysis, review and diagnosing of the alarm systems performance.

The ITN 204 may further include one or more systems or apparatus for storing data, recovering data, transmitting data, manipulating data, and protecting data or information so that the data may be exchanged among different groups. In an example, ITN 204 is a remote network which is connected to the OTN 202 using the unidirectional gateway 206. As mentioned previously, the OTN 202 includes a data processing system 208 for converting different types of data originating from various control systems within the OTN 202 into files which may then be transmitted through the unidirectional gateway 206 to the ITN 204. In operation, multiple field sensors positioned at appropriate locations within an industry facility may monitor various events or values of monitored parameters, such as pressure, temperature, and such. The values of such monitored parameters may be typically optioned from control systems like DCS, PLC's and SIS which are connected to the field sensors within the OTN 202 (as will be explained in further detail in FIG. 3).

The data processing system 208, in an example, may continuously obtain the event data 210 of the plurality of control systems within the system 200. The event data 210 may pertain to one or more events occurring in the industrial facility under consideration (not shown in FIG. 1). Once obtained, the data processing system 208 may process the event data 210 to generate event file(s) 212. In an example, the event file(s) 212 includes the event data 210 of the plurality of control systems of the OTN 202 in structured form and may be in different formats. In an example, multiple event file(s) 212 may be in the form of a chronologically arranged or arranged in the order of event data obtained. The size of the event file(s) 212 that is generated may be configurable. For example, the event file(s) 212 may be generated based on a predefined logic. Example of such logic includes generating the event files of certain specified size. In such a case, the predefined logic may result in generation of the event file(s) 212 once volume data collected exceeds a predefined level. In another example, the event file(s) 212 may be generated at specified instances or intervals, such as every minute. It may be noted that these implementations are only exemplary. Any other logic may also be used without deviating from the scope of the present subject matter. Examples of format of the event file(s) 212 includes, but is not limited to, a text file or JavaScript Object Notation (JSON).

Once the event file(s) 212 are generated, the data processing system 208 causes transmission of the event file(s) 212 through the unidirectional gateway 206 to the ITN 204. An example of unidirectional gateway 206 is a data diode. On receiving the event file(s) 212, the ITN 204 may process the same and generate event related insights. Such insights may be utilized for implementing desired alarm management solutions and features within the ITN 204. In an example, the event file(s) 212 may be processed by the event processor 218 to provide the insights.

In another example, attribute data 214 pertaining to one or more operational parameters of various control systems and/or process safety systems may also be collected, periodically as a batch. The attribute data 214 thus collected may correspond to one or more metrics pertaining to the distributed control systems and/or process safety systems within the OTN 202. Examples of such metrics include, number of standing alarms, current list of alarm conditions that active, current list of active alarm conditions that are shelved, current shelving status of different alarm conditions, current suppression status of different alarm conditions, suppression status of different tags and alarm conditions. The attribute data 214 may be considered as representing a state of the alarm management functions that may be implemented within the OTN 202. Attribute data pertaining to other metrics may also be collected without any limitation. It may be noted that such different data pertaining to different metrics are processed together as a batch. In some cases, the attribute data 214 may not be required by the ITN 204 continuously or in real-time. In an example, the attribute data 214 may be used by the ITN 204 for either checking correctness of the event data 210, for purposes of assessing state of the select metrics of various systems of the OTN 202, or for validating the state of alarm management functions within the OTN 202. In this context, once the attribute data 214 is collected, the data processing system 208 may store the attribute data 214 as a batched attribute data in a buffer until a predefined condition is met. Examples of predefined condition include, but are not limited to, completion of batch based on attribute data, or start of another batch based on the attribute data.

Returning to the present example, on determining that the storage of attribute data 214 conforms to one of the predefined conditions, the data processing system 208 generates an attribute file, such as attribute file 216 based on the attribute data 214. Once generated, the data processing system 208 causes transmission of the attribute file 216 through the unidirectional gateway 206 to the ITN 204. Thereafter, the processing devices installed within the ITN 204 utilizes the event file(s) 212 along with the attribute file 216 for use in alarm management solutions and features which when implemented assists in management of alarms and other operational issues which are occurring in the OTN 202. These aspects are further discussed in greater detail in conjunction with FIGS. 3-4.

Figure 3:
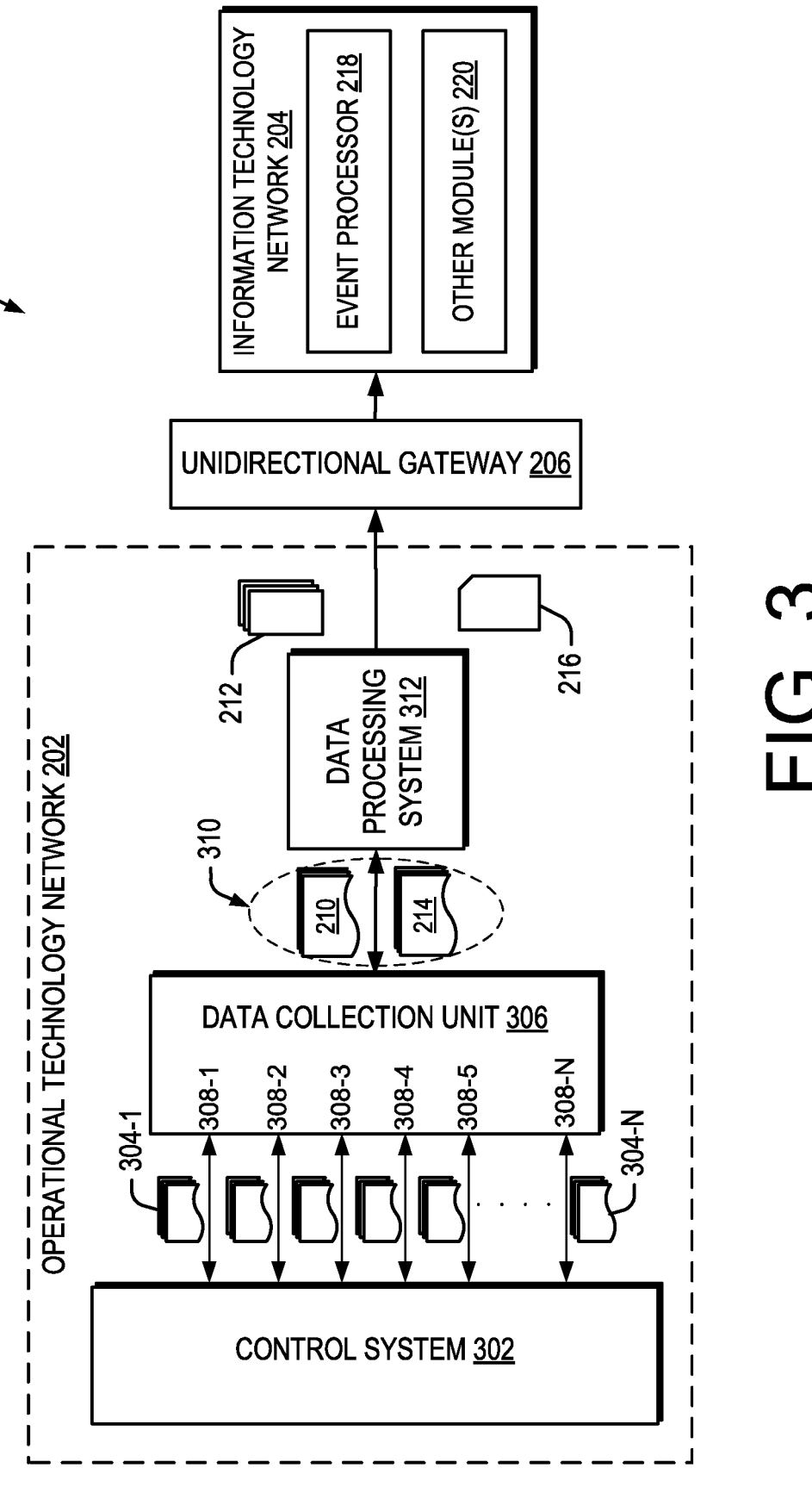
FIG. 3 illustrates industrial control system within any industrial facility implementing an industrial process, as per another example.
Figure 4:
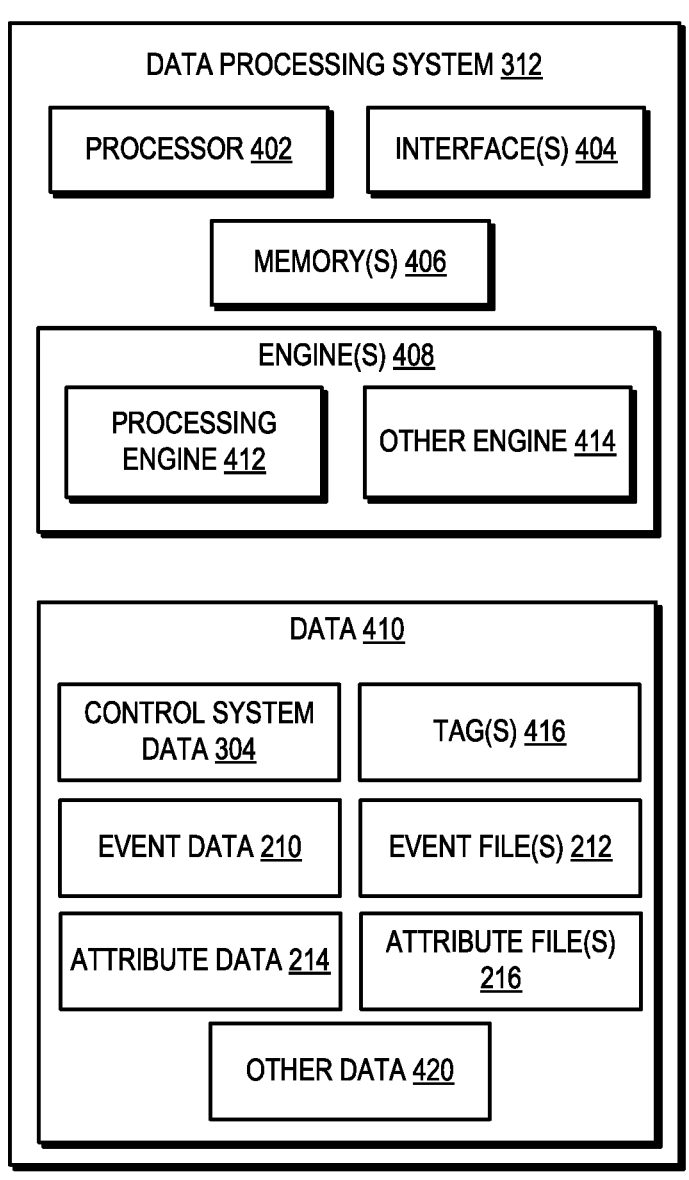
FIG. 4 illustrates a block diagram of a data processing system, as per an example.

FIGS. 3-4 illustrates an industrial system 300 and a data processing system provided in the industrial system 300, according to another example of the present subject matter. Similar to the system 200, as described in FIGS. 1-2, the industrial system 300 (referred to as system 300) also includes an operational technology network, such as OTN 202 and an information technology network, such as ITN 204 which are connected with each other using a unidirectional gateway, such as unidirectional gateway 206.

As described above as well, the OTN 202 includes combination of software and hardware device which process and use operational data, such as telecommunication data, technical components data, and computers data, to monitor and implement appropriate actions for various events occurring in the industry. As illustrated in FIG. 3, the OTN 202 includes a control system 302. The control system 302 within the OTN 202 may comprise one or more other systems. Examples of such other systems include, but is not limited to, distributed control systems (DCS), Safety Instrumented Systems (SIS), Programmable Logic Controllers (PLCs), or combinations thereof. It is noted that the DCS, SIS, or PLCs, are only examples of control system 302—any other functional system may be a part of the control system 302 without limiting the scope of the present subject matter. Returning to the present example, the control system 302 (and its systems), may collect real-time data from field sensors either directly or through other systems installed at a facility. The control system 302 may process such data which may be used to detect any deviations or cause changes by controlling devices, and processes. Such control system 302 may further include a plurality of control systems (not shown in FIG. 3).

The OTN 202 may include a plurality of field sensors (not shown in FIG. 3) which may be positioned at various relevant locations around the factory site for monitoring changes in their environment and sending that information as variables to computing devices installed in each of the control systems of the control system 302. It may be noted that, although only one control system 302 is described in the aforesaid implementation of the present subject matter, however, any number of such control systems may be installed in the OTN 202 without deviating from the scope of the present subject matter.

On receiving such data from the field sensors, the control system 302 processes the same and generates control system data 304-1, . . . , 304-N (collectively referred to as control system data 304). In an example, the control system data 304 includes event data 210 pertaining to events in the plurality of control systems, and attribute data 214 pertaining to operational parameters of each of the control systems. In an example, based on the processing, the control system 302 generates instructions to direct different actuators for controlling mechanism of various systems which are performing processes in the factory site.

In another example, control system 302 transmits the Control system data 304 to a data collection unit 306. The control system 302 may be communicatively coupled to the data collection unit 306 over different communication channels 308-1, 308-2, 308-3, . . . 308-N (collectively referred to as channels 308). The channels 308 enable data communication between the control system 302 and the data collection unit 306 using different communication protocols. Examples of such communication protocols include, but are not limited to, OPC alarm and event (OPC AE), OPC unified architecture alarms and conditions (OPC UA AC), open database connectivity (ODBC), transmission control protocol/internet protocol (TCP/IP), serial communication protocol, and file transfer protocol. To this end, the control system 302 may include a variety of computing devices which process data from the field sensors to generate control system data 304 in different formats and communicate it based on the corresponding protocols applicable for the corresponding channels 308. For example, a DCS which is capable of transmitting data serially may generate data, say control system data 304-1, in serial format say over channel 308-1. In a similar manner, control system data 304-2 may be generated and communicated over the channel 308-2. It may be noted that based on the communication capabilities of the corresponding control systems, the appropriate channel (i.e., any one of the channels 308) may be elected and the control system data 304 may be communicated. It may be noted that similar methodology may be adopted in case multiple control systems (similar to the control system 302) are present in the system 300, wherein such different control system may communicate the event data 210 separately over different channels.

As described previously, the control system data 304 may include the event data 210 and the attribute data 214. To aid in identification of the event data 210 and the attribute data 214 within the control system data 304, the control system 302 may tag the data being shared with the data collection unit 306. Based on the tag, the subsequent data being generated (referred to as the collection data 310) by the data collection unit 306 may uniquely indicate whether the collection data 310 is one of the event data 210 or the attribute data 214. Depending on the tag associated with the collection data 310, the data collection unit 306 may determine whether the collection data 310 is the event data 210 or the attribute data 214. In an example, the event data 210 and/or the attribute data 214 being shared by the control system 302 may be linked with certain associated information. Such associated information (e.g., metadata), may specify information pertaining to the event data 210 and the attribute data 214. For example, the associated information may specify the source control system for either the event data 210 or the attribute data 214. In another example, the associated information may indicate a time stamp or signature indicating the instant of time when either the event data 210 or the attribute data 214 may have been generated. It may be noted that any other type of associated information may also be linked with either of the event data 210 or the attribute data 214—such examples are only indicative and other types of associated information may also be used without deviating from the scope of the present subject matter.

The tagging of the control system data 304 may be based on a number of criteria. For example, the tags may be associated based on the source control system from which the data is obtained. In another example, the nature or category of the collection data 310 may be based on the communication protocol of any one of the channels 308 used for communicating the control system data 304 from the control system 302 to the data collection unit 306. For example, if the control system data 304 is transmitted using OPC A&E subscription protocol, then the control system data 304 may be tagged as event data 210. It may be noted that, above described factors based on which the tagging of the control system data 304 is performed are exemplary and any other factor may be used for tagging without deviating from the scope of the present subject matter.

The following description is provided to explain the manner in which the data collection unit 306 may further handle the event data 210 and the attribute data 214. Once tagged as event data 210, the data collection unit 306 transmits that collection data 310 (i.e., the event data 210) continuously to a data processing system 312. The data processing system 312 may be similar to the data processing system 208. The functioning of the data processing system 312 is described in conjunction with FIG. 4 which depicts various exemplary functional blocks of the data processing system 312.

As described in FIG. 4, the data processing system 312 includes a processor 402, interface(s) 404, and memory(s) 406. The processor 402 may be implemented as microprocessors, microcomputers, microcontrollers, digital signal processors, central processing units, state machines, logic circuitries, and/or other devices that manipulate signals based on operational instructions. The interface(s) 404 may allow the connection or coupling of the data processing system 312 with one or more other devices (say devices or systems within the OTN 202), through a wired (e.g., Local Area Network, i.e., LAN) connection or through a wireless connection (e.g., Bluetooth®, Wi-Fi). The interface(s) 404 may also enable intercommunication between different logical as well as hardware components of the data processing system 312.

The memory(s) 406 may be a computer-readable medium, examples of which include volatile memory (e.g., RAM), and/or non-volatile memory (e.g., Erasable Programmable read-only memory, i.e., EPROM, flash memory, etc.). The memory(s) 406 may be an external memory, or internal memory, such as a flash drive, a compact disk drive, an external hard disk drive, or the like. The memory(s) 406 may further include data which either may be utilized or generated during the operation of the data processing system 312.

The data processing system 312 may further include engine(s) 408 and data 410. The engine(s) 408 may be implemented as a combination of hardware and programming, for example, programmable instructions to implement a variety of functionalities of the engine(s) 408. In examples described herein, such combinations of hardware and pro gramming may be implemented in several different ways. For example, the programming for the engine(s) 408 may be executable instructions. Such instructions may be stored on a non-transitory machine-readable storage medium which may be coupled either directly with the data processing system 312 or indirectly (for example, through networked means). In an example, the engine(s) 408 may include a processing resource, for example, either a single processor or a combination of multiple processors, to execute such instructions. In the present examples, the non-transitory machine-readable storage medium may store instructions that, when executed by the processing resource, implement engine(s) 408. In other examples, the engine(s) 408 may be implemented as electronic circuitry.

The engine(s) 408 includes a processing engine 412 and other engine(s) 414. The other engine(s) 412 may further implement functionalities that supplement functions performed by the system data processing 312 or any of the engine(s) 408. The data 410, on the other hand, includes data that is either stored or generated as a result of functions implemented by any of the engine(s) 408 or the data processing system 312. It may be further noted that information stored and available in data 410 may be utilized by the engine(s) 408 for performing various functions by the data processing system 312. In an example, data 410 may include control system data 304, tag(s) 416, the event data 210, event file(s) 212, attribute data 214, attribute file 216, and other data 420. It may be noted that such examples are only indicative. The present approaches may be applicable to other examples without deviating from the scope of the present subject matter.

In operation, the processing engine 412 of the data processing system 312 may obtain the event data 210 and store it within the data processing system 312. The processing engine 412 may thereafter process the event data 210 to generate the event file(s) 212. The event file(s) 212 may be in a format in which the event data 210 is provided in a predefined structured format. For example, the event file(s) 212 may be such that the event data 210 included therein is arranged in a chronological order. To this end, the processing engine 412 may determine a time stamp or a similar time-based signature based on which the event data 210 may be arranged chronologically within the event file(s) 212. Although described in the context of structuring the event data 210 chronologically, the event data 210 may be structured on any one or more of the associated information (such as metadata) corresponding to the event data 210. Once structured, the processing engine 412 may generate the event file(s) 212 in a prescribed format. The format of the event file(s) 212 may be elected such that the event file(s) 212 may be processable by systems or modules (such as the event processor 218) within the ITN 204. In an example, the event file(s) 212 may be in text-based format. In another example, the event file(s) 212 may be in a JSON file format. In yet another example, the format of the event file(s) 212 may be such that it is processable by the event processor 218 within the ITN 204. The processing engine 412 while generating the event file(s) 212 may rely on predefined logic to obtain event file(s) 212 of predetermined sizes. For example, the processing engine 412 may continuously store the event data 210 in the event file(s) 212 till the predefined time period has elapsed or if the event file(s) 212 is of a predefined threshold size. With the event file(s) 212 are generated, the processing engine 412 may transmit the event file(s) 212 to the ITN 204 through the unidirectional gateway 206. In an example, the unidirectional gateway 206 may be a data diode.

Although the event data 210 (and consequently the event file(s) 212) may be utilized by the event processor 218 in the ITN 204 to provide insights and information in (near) real-time, the attribute data 214 (and the attribute file 216) may be communicated to the ITN 204 in an intermittent or periodic manner. For example, the attribute data 214 may be considered information as corresponding to the operational parameters or state of distributed control systems and/or process safety systems or PLC's, as opposed to the specific values (e.g., alarm events) that may have been monitored and obtained by the system 300.

In an example, the processing engine 412 on receiving the collection data 310 may determine its corresponding tag(s) 416. Based on the tag(s) 416, the processing engine 412 may identify and categorize the collection data 310 as the attribute data 214. The attribute data 214 thus obtained may be stored in data 410. The attribute data 214 may correspond to information pertaining to the operational parameters or state of distributed control systems and/or process safety systems or PLC's. For example, the attribute data 214 may indicate the number of alarms that may be active for a given facility or for a given industrial process that is to be monitored. In another example, the attribute data 214 may also include geographic specific information pertaining to the different alarms that are implemented for an organization. Other examples include, current list of alarm conditions that active, current list of active alarm conditions that are shelved, current shelving status of different alarm conditions, current suppression status of different alarm conditions, suppression status of different tags and alarm conditions or other such metric information. Such information may be stored as attribute data 214 in the data 410 of the data processing system 312.

In an example, the processing engine 412 may store and retain the attribute data 214 as it is received from the data collection unit 306 till a predefined condition is met. Till such predefined condition is met, the processing engine 412 may store the attribute data 214 as a batch. The predefined condition may be either completion of batch based on attribute data 214 or start of another batch based on the attribute data 214. In case the predefined condition is the completion of batch based on specific attribute data from amongst the attribute data 214, the processing engine 412 may continuously store the attribute data 214 till the predefined condition of end of batch attribute data is encountered and processed. It may be noted that a batch may be considered as complete when all values of the prescribed metrics have been obtained.

Once the batch is complete, the processing engine 412 may process the batch of the attribute data 214 stored in data 410 to generate the attribute file 216. The attribute file 216 thus generated may include metric information pertaining to the operational parameters or state of distributed control systems and/or process safety systems, PLCs within the system 300. It may be noted that the frequency or periodicity may be defined for different types of metric information. Accordingly, certain types of metric information (like status of active alarm conditions, shelved conditions) may be clubbed or batched processed to generate the attribute file 216. In certain other instances, the certain other types of metric information (say tag level suppressions) may be processed and corresponding attribute file 216 may be generated, separately.

Once the attribute file 216 is generated, the same may be communicated over the unidirectional gateway 206 to the ITN 204. The attribute file 216 may thereafter be processed by the event processor 218 to provide insights into the metrics pertaining to the distributed control systems and/or process safety systems, PLCs within the system 300. For example, the event processor 218 may be configured to process the attribute file 216 to determine the proportion of alarms or other control functions which may be active. As explained, the attribute file 216 is generated and transmitted periodically depending on the predefined condition. In between the sharing and processing of the attribute file 216 by the event processor 218, it is possible that the operational parameters of the distributed control systems and/or process safety systems, PLCs may change. Any subsequent sharing of the attribute file 216 (and processing by the event processor 218) would result in synchronizing the metrics that may be available for different points or nodes within the ITN 204. In another example, the processing of the attribute file 216 may be utilized to provide metrics for assessment and validation of performance metrics of DCS, process safety systems or PLC's. In such a case, the event processor 218 may compare the metrics obtained based on the analysis of the attribute file 216 received from the OTN 202, with the corresponding current metrics to improve metrics accuracy. Based on the comparison with the metrics, the event processor 218 may adjust and correct the current metrics which enables in improving the metrics accuracy which in turn is used for ascertaining the alarm performance of the DCS, safety process systems conform with prescribed requirements.

Figure 5:
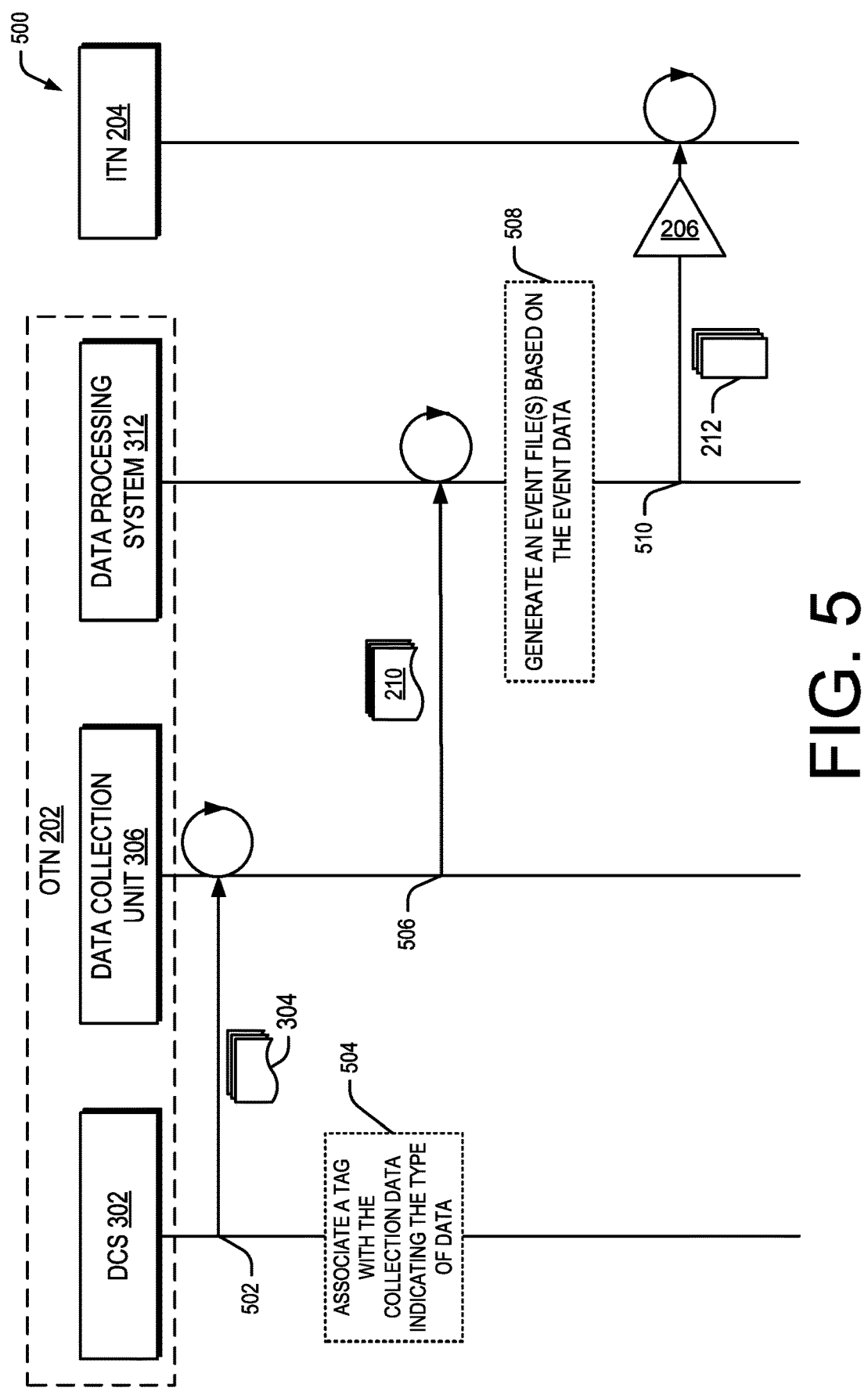
FIG. 5 illustrates an example call flow diagram representing communication between various computational entities of an industrial control system, as per an example.

FIG. 5 illustrates an example call flow diagram representing communication between various computational entities of an industrial system (such as one of the system 200-300 as described in FIGS. 2-3), as per one example. The present explanation is provided with reference to the system 300. As described, the system 300 may include the OTN 202 and the ITN 204. The OTN 202 includes control system 302 which may be in communication with the data collection unit 306. The data collection unit 306 in turn may be in communication with the data processing system 312. Further, the data processing system 312 of the OTN 202 is in communication with the ITN 204 through the unidirectional gateway 206.

As described previously, various field sensors installed as part of the system 300 monitor or detect changes in its environment and communicates monitored information to the control system 302. The control system 302 in turn processes the data monitored by sensors to generate control system data 304. In an example, the control system data 304 pertains to one of event data (data corresponding to events occurring in the control systems of the DCS) and attribute data (data pertaining to operational parameters of the control systems of the DCS, and also explained in conjunction with later figures). The control system 302, on receiving control system data 304 from the field sensors, may continuously transmit the control system data 304 to the data collection unit 306 (as indicated by step 502).

The control system 302 may communicate the control system data 304 to the data collection unit 306 via one or more communication channels, such as channels 308. Each of such channels 308 may implement communication using different communication protocols. Examples of such communication protocols implemented on various channels 308 include, but are not limited to, OPC alarm & event (OPC AE), OPC unified architecture Alarms and Conditions (OPC UA AC), open database connectivity (ODBC), transmission control protocol/internet protocol (TCP/IP), serial communication protocol, and file transfer protocol.

In an example, to aid in identification of the event data 210 and the attribute data 214 within the control system data 304, the control system 302 may tag the data being shared with the data collection unit 306 with one or more tag(s) 416 (as depicted by step 504). Based on the tag(s) 416, the subsequent data being generated (referred to as the collection data 310) by the data collection unit 306 may uniquely indicate through tag(s) 416 whether the collection data 310 is one of the event data 210 or the attribute data 214. The collection data 310 may then be communicated to the data processing system 312. Depending on the tag associated with the collection data 310, the data collection unit 306 may determine whether the collection data 310 is the event data 210 or the attribute data 214. In FIG. 5, the example depicted pertains to the data processing system 312 determining that the incoming collection data 310 is the event data 210.

The event data 210 is continuously transmitted by the data collection unit 306 to the data processing system 312 (as indicated in step 506). In an example, the processing engine 412 of the data processing system 312 may obtain the event data 210 and store it within the data processing system 312. The processing engine 412 may thereafter process the event data 210 to generate the event file(s) 212 (as indicated in step 508). The event file(s) 212 may be in a format in which event data 210 is provided in a predefined structured format. For example, the event file(s) 212 may be such that the event data 210 included therein is arranged in a chronological order. In an example, the event file(s) 212 may be generated based on a predefined logic to generate event file(s) 212 of certain specified sizes. In such a case, the predefined logic may result in generation of the event file(s) 212 once volume data collected exceeds a predefined level. In another example, the event file(s) 212 may be generated at specified instances or intervals, such as every minute. Any other logic may be used without deviating from the scope of the present subject matter.

Once the event file(s) 212 are generated, the same may be communicated to the ITN 204 over the unidirectional gateway 206 (as indicated in step 510). The event file(s) 212 are received by the ITN 204, wherein the event processor 218 may process the event file(s) 212, to provide the alarm information and metrics pertaining to alarm system performance in near real time. In an example, the event file(s) 212 may be processed by the event processor 218 to provide various insights into the activity of the alarms.

Figure 6:
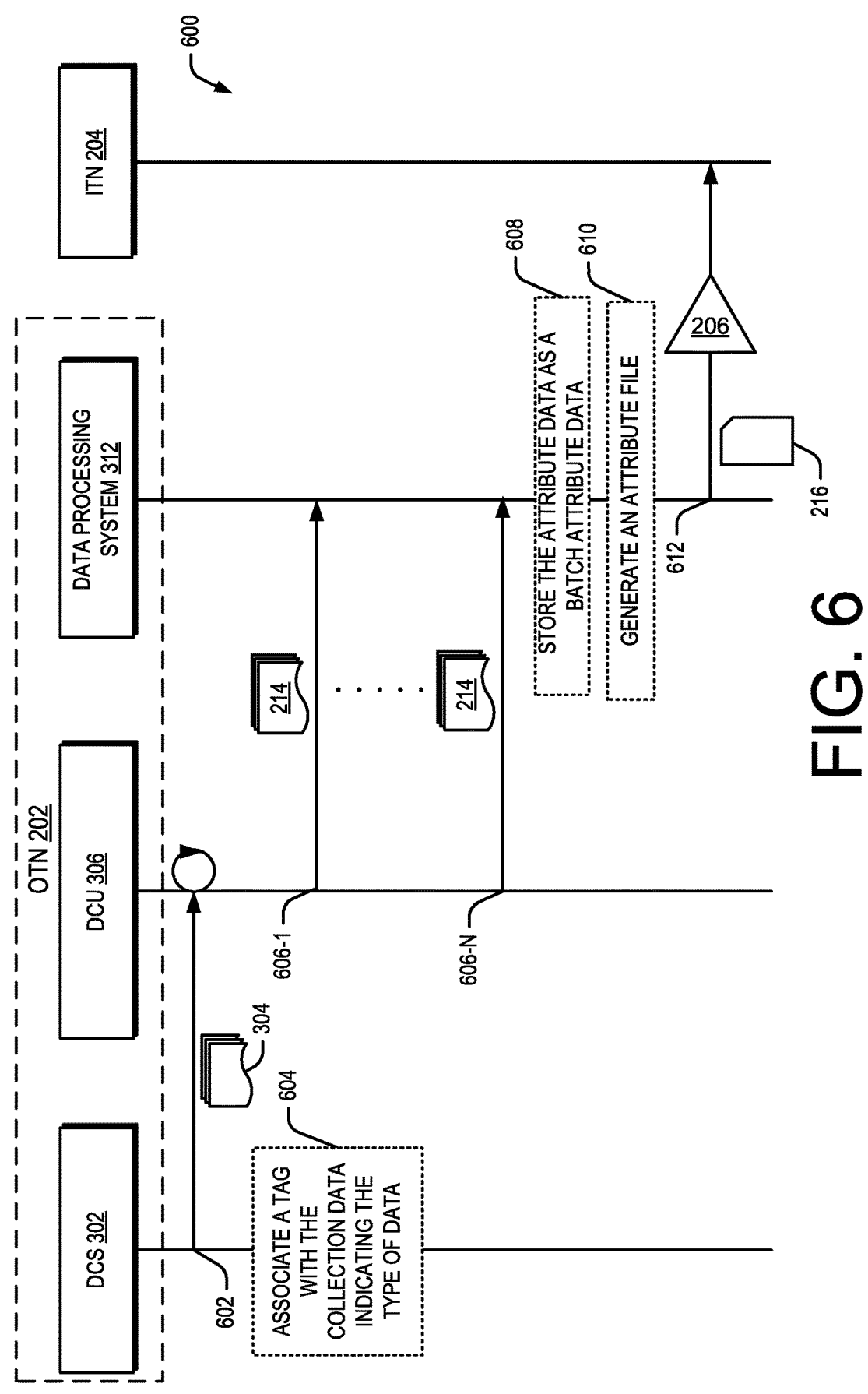
FIG. 6 illustrates another example call flow diagram representing communication between various computational entities of an industrial control system, as per another example.

FIG. 6 illustrates an example call flow diagram representing communication between various computational entities of an industrial system (such as one of the system 200-300), as per one example. The present explanation is provided with reference to the system 300. Similar to the example depicted in FIG. 5, the system 300 may include the OTN 202 and the ITN 204. The OTN 202 includes a distributed control system, such as control system 302 which may be in communication with a data collection unit 306. The data collection unit 306 in turn may be in communication with the data processing system 312. FIG. 5 depicted the manner in which the event data 210, while FIG. 6 is to explain the manner in which the attribute data 214 is handled.

As described previously, various field sensors installed as part of the system 300 monitor or detect changes in its environment and communicates monitored information to the control system 302. The control system 302 in turn processes the data monitored by sensors to generate control system data 304. In an example, the control system data 304 pertains to one of event data (data corresponding to events occurring in the control systems of the DCS) and attribute data (data pertaining to operational parameters of the control systems of the DCS). The control system 302, on receiving control system data 304 from the field sensors, may transmit the control system data 304 to the data collection unit 306 (as indicated by step 602).

Similar to FIG. 5, the control system 302 may communicate the control system data 304 to the data collection unit 306 via one or more communication channels, such as channels 308. Each of such channels 308 may implement communication using different communication protocols. Examples of such communication protocols implemented on channels 308 include, but are not limited to, OPC alarm & event (OPC AE), OPC unified architecture alarms and conditions (OPC UA AC), open database connectivity (ODBC), transmission control protocol/internet protocol (TCP/IP), serial communication protocol, and file transfer protocol.

In an example, to aid in identification of the event data 210 and the attribute data 214 within the control system data 304, the control system 302 may tag the data being shared with the data collection unit 306 with one or more tag(s) 416 (as depicted by step 604). Based on the tag(s) 416, the subsequent data being generated (referred to as the collection data 310) by the data collection unit 306 may uniquely indicate through tag(s) 416 whether the collection data 310 is one of the event data 210 or the attribute data 214. The collection data 310 may then be communicated to the data processing system 312. Depending on the tag associated with the collection data 310, the data collection unit 306 may determine whether the collection data 310 is the event data 210 or the attribute data 214. The attribute data 214 thus collected may correspond to one or more metrics pertaining to the distributed control systems and/or process safety systems, PLCs within the OTN 202. Examples of such metrics include, current list of alarm conditions that are active, current list of active alarm conditions that are shelved, current shelving status of different alarm conditions, current suppression status of different alarm conditions, suppression status of different tags and alarm conditions, and the like. The attribute data 214 may be considered as representing a state of the alarm management metrics that may be implemented within the OTN 202.

At steps 606-1, . . . , 606-N, the data collection unit 306 may transmit the attribute data 214 to the data processing system 312. It may be noted that the attribute data 214 may be obtained and stored within the data processing system 312. The data processing system 312 may continue to collect and store the attribute data 214 till a predefined condition is met. To explain as an example, the processing engine 412 may store and retain the attribute data 214 as it is received from the data collection unit 306 and may store the attribute data 214, as a batch. The predefined condition may be either completion of batch based on attribute data 214 or start of another batch based on the attribute data 214*t*. In case the predefined condition is the completion of batch based on specific attribute data from amongst the attribute data 214, the processing engine 412 may continuously store the attribute data 214 till the predefined condition of end of batch attribute data is encountered and processed.

In this context, the data processing system 208 may store the attribute data 214 as a batched attribute data in a buffer until a predefined condition is met (indicated as step 608). Examples of predefined condition include, but are not limited to, completion of batch based on attribute data, or start of another batch based on the attribute data. On determining that the storage of attribute data 214 conforms to one of the predefined conditions, the data processing system 208 generates an attribute file 216 based on the attribute data 214 (as indicated in step 610).

Once the attribute file 216 is generated, the data processing system 312 may transmit the same to the ITN 204. In an example, the data processing system 208 causes transmission of the attribute file 216 through the unidirectional gateway 206 to the ITN 204 (as indicated in step 612). Thereafter, the processing devices installed within the ITN 204 utilizes the event file(s) 212 along with the attribute file 216 for use in alarm management solutions and features which when implemented aids in the better management of alarms and other operational issues which are occurring in the OTN 202.

FIG. 7 illustrates a method for managing alarms in an industrial system, as per another example. The order in which the above-mentioned method is described is not intended to be construed as a limitation, and some of the described method blocks may be combined in a different order to implement the method, or an alternative method.

Furthermore, the above-mentioned method may be implemented in a suitable hardware, computer-readable instructions, or combination thereof. The steps of such method may be performed by either a system under the instruction of machine executable instructions stored on a non-transitory computer readable medium or by dedicated hardware circuits, microcontrollers, or logic circuits. For example, the method may be performed by a data processing system, such as data processing system 208 or data processing system 312. In an implementation, the method may be performed under an "as a service" delivery model, where the data processing system 208 or the data processing system 312, operated by a provider, receives programmable code. Herein, some examples are also intended to cover non-transitory computer readable medium, for example, digital data storage media, which are computer readable and encode computer-executable instructions, where said instructions perform some or all the steps of the above-mentioned methods.

In an example, the method 700 may be implemented by the data processing system 312 for transmitting an attribute file, such as the attribute file 216, to an information technology network, such as the ITN 204. To this end, at block 702, attribute data pertaining to operational parameters of a plurality of control systems in an operational technology network of an industrial control system is collected from a data collection unit. For example, the processing engine 412 of the data processing system 312 may collect the attribute data 214 pertaining to one or more operational parameters of various control systems and/or process safety systems, or PLC's, from the data collection unit 306. The attribute data 214 may indicate the number of alarms that may be active for a given facility or for a given industrial process that is to be monitored, or any other metric pertaining to such systems. Such information may be stored as attribute data 214 in data 410 of the data processing system 312.

In another example, the processing engine 412 may receive a collection data, such as the collection data 310, from the data collection unit 306. Once received, the processing engine 412 may determine its corresponding tag(s) 416. Based on the tag(s) 416, the processing engine 412 may identify and categorize the collection data 310 as the attribute data 214. The attribute data 214 thus obtained may be stored in data 410.

At block 704, the collected attribute data is stored as a batch attribute data. For example, the processing engine 412 may store and retain the attribute data 214 as it is received from the data collection unit 306 till a predefined condition is met, in a batch. The predefined condition may be either completion of batch based on Attribute data, or start of another batch based on the attribute data In case the predefined condition is the completion of batch based on specific attribute data, the processing engine 412 may continuously store the attribute data 214 till the predefined condition of end of batch attribute data is encountered and processed. Once completed, the processing engine 412 may process the batch attribute data 214 to generate the attribute file 216. Other examples of predefined conditions may also be utilized without deviating from the scope of the present subject matter.

At block 706, an attribute file is generated based on the batch attribute data. For example, once one of the predefined conditions is met, the processing engine 412 may process the batch attribute data 214 to generate the attribute file 216. The attribute file 216 once generated may be stored in data 410 in the data processing system 312.

The attribute file 216 thus generated may include metric information pertaining to the operational parameters or alarm system performance state of distributed control systems and/or process safety systems PLCs within the system 300. It may be noted that the frequency or periodicity may be defined for different types of metric information. Accordingly, certain types of metric information may be clubbed or batched processed to generate the attribute file 216. In certain other instances, the certain other types of metric information may be processed and corresponding attribute file 216 may be generated, separately.

At block 708, the attribute file is transmitted through a unidirectional gateway to the information technology network. For example, once the attribute file 216 is generated, the processing engine 412 transmits the attribute file 216 through the unidirectional gateway 206 to the ITN 204. The attribute file 216 may thereafter be processed by the event processor 218 implemented within the ITN 204 to provide insights into the metrics pertaining to the distributed control systems and/or process safety systems, PLC's within the system 300. In an example, the event processor 218 may be configured to process the attribute file 216 to determine the proportion of alarms or other control functions which may be active.

Figure 8:
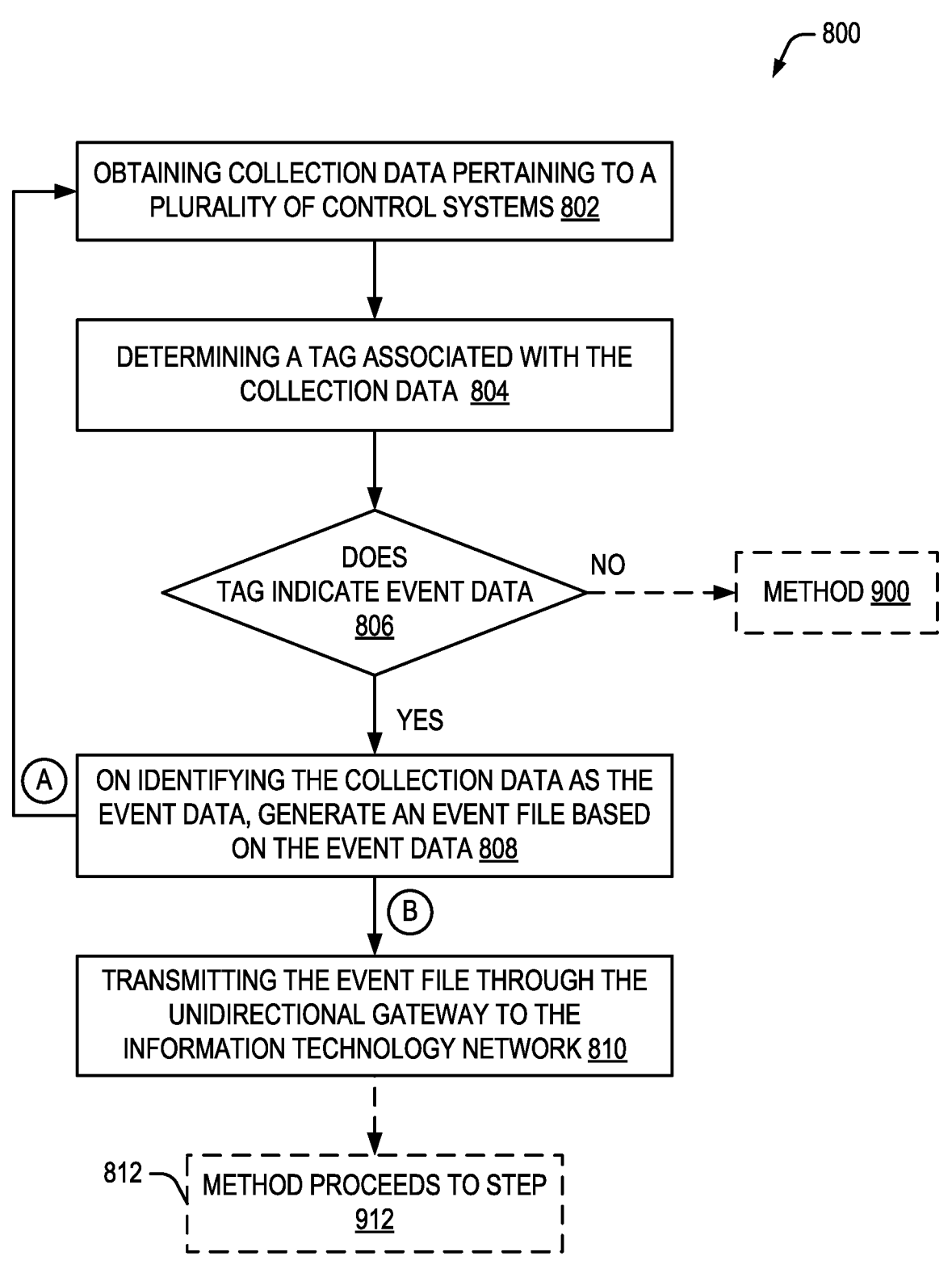
FIG. 8-9 illustrates methods for managing monitoring and assessing alarms and events in an industrial control system, as per an example.
Figure 9:
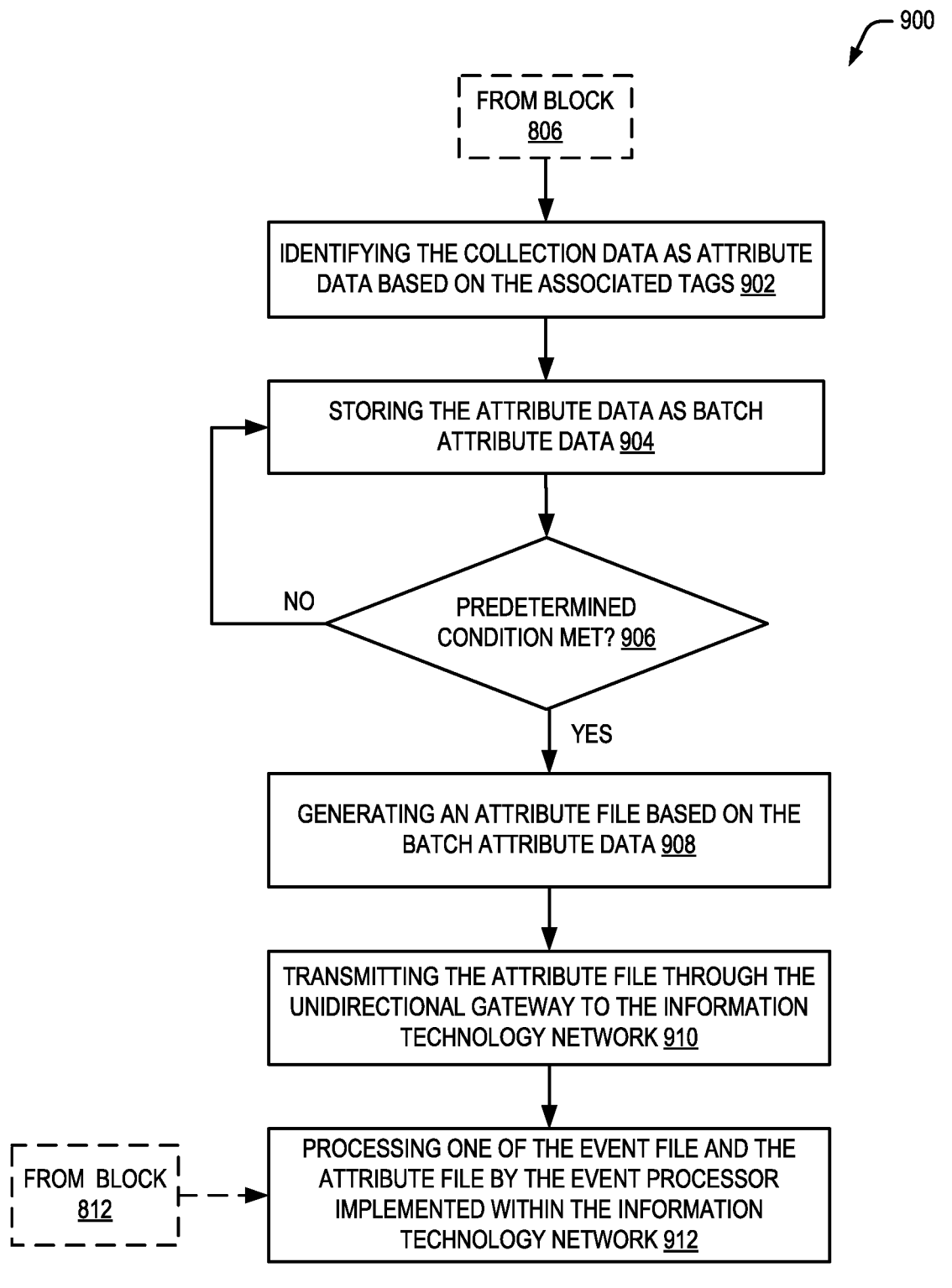

FIG. 8-9 illustrates methods for managing alarms in an industrial system, as per another example. The order in which the above-mentioned methods are described is not intended to be construed as a limitation, and some of the described method blocks may be combined in a different order to implement the methods, or alternative methods.

Furthermore, the above-mentioned methods may be implemented in a suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by a data processing system, such as data processing system 208 or data processing system 312. In an implementation, the methods may be performed under an "as a service" delivery model, where the data processing system 208 or the data processing system 312, operated by a provider, receives programmable code. Herein, some examples are also intended to cover non-transitory computer readable medium, for example, digital data storage media, which are computer readable and encode computer-executable instructions, where said instructions perform some or all the steps of the above-mentioned methods.

In an example, the methods 800-900 may be implemented by the data processing system 312 for managing alarms in an industrial system, such as system 300. At block 802, collection data pertaining to a plurality of control systems is obtained. For example, the data processing system 312 may obtain collection data 310. The collection data 310, in turn, may be provided by the data collection unit 306 based on the control system data 304 received from the control system 302.

At block 804, a tag associated with the collection data may be determined. For example, the processing engine 412 may process the collection data 310 to determine the tag associated with the collection data 310. In an example, to aid in identification of the event data 210 and the attribute data 214 within the control system data 304, the control system 302 may tag the data being shared with the data collection unit 306 with one or more tag(s) 416. Based on the tag, the collection data 310 generated by the data collection unit 306 may uniquely indicate whether the collection data 310 is one of the event data 210 or the attribute data 214.

At block 806, a determination is made to assess whether the collection data received is event data or attribute data. For example, the processing engine 412 may process the tag(s) 416 associated with the collection data 310 to ascertain whether the collection data 310 comprises event data 210 or the attribute data 214. If it is determined that the collection data 310 is event data 210 ('Yes' path from block 806) the method proceeds to block 808. On the other hand, if the processing engine 412 determines, based on the tag(s) 416, that the collection data 310 comprises attribute data 214 ('No' path from block 806), the method may proceed to the method 900 (which is described in conjunction with FIG. 9).

Returning to the present method, at block 808, an event file may be generated. For example, the processing engine 412 may process the event data 210 to generate the event file(s) 212. The event file(s) 212 may be in a format in which the event data 210 is provided in a predefined structured format. In an example, the event data 210 included therein may be arranged in a chronological order. To this end, the processing engine 412 may determine a time stamp or a similar time-based signature based on which the event data 210 may be arranged chronologically within the event file(s) 212.

As described in relation to FIGS. 1-6, the event data 210 is obtained continuously and in (near) real-time. Consequently, the event file(s) 212 too is generated continuously. In this context, the method proceeds through two paths (namely, path A and path B) from block 808. In an example, once the event file(s) 212 is generated, the present method proceeds back to block 802 wherein the next or subsequent event data 210 may be obtained (path 'A' from block 808). In this manner, the entire process is repeated again wherein the event data 210 that may be subsequently obtained is again processed to obtain the event file(s) 212 (blocks 802-808). In an example, the event file(s) 212 may be generated based on a predefined logic. Example of such logic includes generating the event files of certain specified size. In such a case, the predefined logic may result in generation of the event file once volume data collected exceeds a predefined level.

The method may also proceed to block 810 ('path 'B' from block 808) wherein the event file generated based on the event data is transmitted to an information technology network through a unidirectional gateway. In an example, the processing engine 412 may transmit the event file(s) 212 through the unidirectional gateway 206 (e.g., a data diode) to the ITN 204. Once the event file(s) 212 is communicated to the ITN 204, the method proceeds to step 912 of method 900 (at block 812).

As described previously, at block 806, the processing engine 412 may ascertain whether the collection data 310 comprises event data 210 or attribute data 214. On determining that the collection data 310 comprises the attribute data 214 ('No' path), the method may proceed to method 900. The method 900, similar to the method 800, may be implemented by the data processing system 312, in one example.

At block 902, the collection data received may be determined as attribute data based on the associated tags. In an example, the processing engine 412 of the data processing system 312 may determine that the collection data 310 comprises attribute data 214 based on the associated tag(s) 416. The attribute data 214 may be considered information as corresponding to the operational parameters or alarm system performance state of distributed control systems and/or process safety systems, as opposed to the specific values (e.g., alarm events) that may have been monitored and obtained by the system 300. The attribute data 214 thus obtained may be stored in data 410.

At block 904, the attribute data may be continuously stored as a batch. For example, the processing engine 412 may store the attribute data 214 as a batch. The processing engine 412 may continue to store the attribute data 214 as a batch till a predefined condition is met. The predefined condition may be completion of batch based on the attribute data 214, or start of another batch based on the attribute data 214. In case the predefined condition is the completion of batch based on specific attribute data, the processing engine 412 may continuously store the attribute data 214 till the predefined condition of end of batch attribute data is encountered and processed.

At block 906, a determination is made to ascertain whether the predefined condition has been met. If the predetermined condition is not met ('No' path from block 906), the processing engine 412 may continue to store the received attribute data 214 till the predefined condition is met (as discussed above). In case the processing engine 412 determines that the predetermined condition has been met (i.e., completion of batch based on attribute data 214, or start of another batch based on the attribute data 214, as discussed above) the method proceeds to block 908 ('Yes' path from block 906).

At block 908, an attribute file is generated based on the batch attribute data. For example, once one of the predefined conditions is met, the processing engine 412 may process the batch of the attribute data 214 to generate the attribute file 216. The attribute file 216 thus generated may include metric information pertaining to the operational parameters or alarm system performance state of distributed control systems and/or process safety systems, PLCs within the system 300. It may be noted that the frequency or periodicity may be defined for different types of metric information. Accordingly, certain types of metric information may be clubbed or batched processed to generate the attribute file 216. In certain other instances, the certain other types of metric information may be processed and corresponding attribute file 216 may be generated, separately.

At block 910, the attribute file is transmitted through the unidirectional gateway to the information technology network. For example, once the attribute file 216 is generated, the processing engine 412 transmits the attribute file 216 through the unidirectional gateway 206 to the ITN 204.

At block 912, one of the event file and the attribute file may be processed by an event processor. For example, the attribute file 216 may be processed by the event processor 218 of the ITN 204 to provide insights into the metrics pertaining to the distributed control systems and/or process safety systems within the system 300. Examples of such metrics include, but are not limited to, load-based metrics, diagnostic metrics, deployment metrics, scaling metrics, audit metrics, and design metrics. For example, diagnostic metrics provide listing and quantity of most frequent alarms, most chattering alarms, etc. and load-based metrics indicate average alarms per unit time, percentage of time units containing more than defined number of alarms etc. In present context, the event processor 218 may be configured to process the attribute file 216 to determine the proportion of alarms or other control functions which may be active. In another example, the event processor 218 may further process the event file(s) 212 (that had been generated and received from method 800). In such manner, similar other metrics or insights may be generated by the event processor 218, based on the event file(s) 212 and the attribute file 216.

Figure 10:
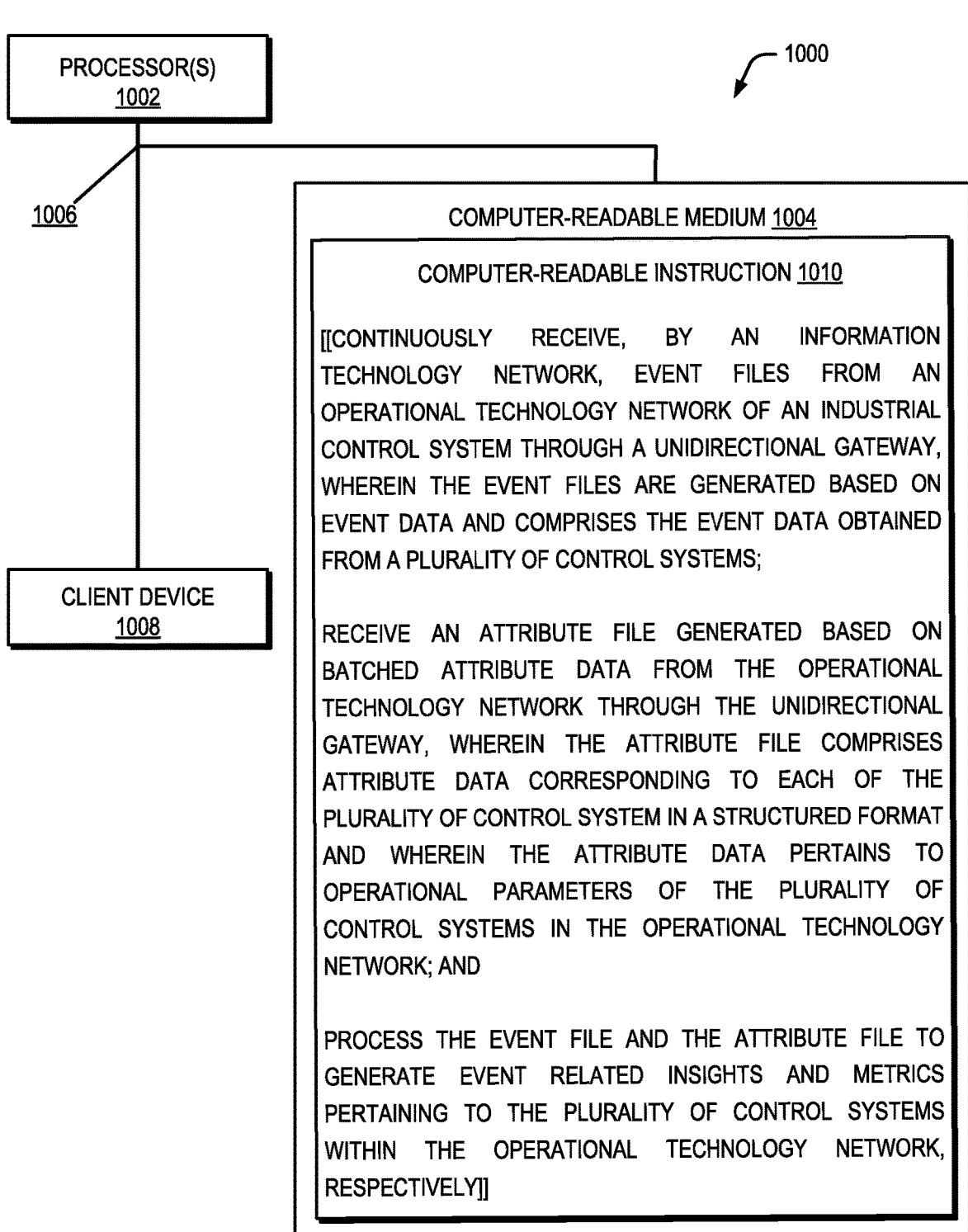
FIG. 10 illustrates a system environment implementing a non-transitory computer readable medium for processing files comprising data corresponding to plurality of control systems for managing alarms in an industrial control system, as per an example.

FIG. 10 illustrates a computing environment 1000 implementing a non-transitory computer readable medium for processing files comprising data corresponding to plurality of control systems for managing alarms in an industrial system. In an example, the computing environment 1000 includes processor(s) 1002 communicatively coupled to a non-transitory computer readable medium 1004 through a communication link 1006. In an example implementation, the computing environment 1000 may be for example, the ITN 204. In an example, the processor(s) 1002 may have one or more processing resources for fetching and executing computer-readable instructions from the non-transitory computer readable medium 1004. The processor(s) 1002 and the non-transitory computer readable medium 1004 may be implemented, for example, in event processor 218 (as has been described in conjunction with the preceding figures).

The non-transitory computer readable medium 1004 may be, for example, an internal memory device or an external memory device. In an example implementation, the communication link 1006 may be a network communication link. The processor(s) 1002 and the non-transitory computer readable medium 1004 may also be communicatively coupled to a computing device 1008 over the network.

In an example implementation, the non-transitory computer readable medium 1004 includes a set of computer readable instructions 1010 (referred to as instructions 1010) which may be accessed by the processor(s) 1002 through the communication link 1006. Referring to FIG. 10, in an example, the non-transitory computer readable medium 1004 includes instructions 1010 that cause the processor(s) 1002 to continuously receive event files, such as event file(s) 212 from an operational technology network, such as OTN 202 of an industrial system, such as system 300. As described previously, industrial system, such as system 300 includes OTN 202 and ITN 204 connected through unidirectional gateway 206. In such an implementation, a data processing system, such as data processing system 312 of the OTN 202 is connected to the ITN 204 through unidirectional gateway 206. Therefore, the instructions 1010 cause the processor(s) 1002 to continuously receive the event file(s) 212 from the data processing system 312 through the unidirectional gateway 206.

It may be noted that, for effective alarm management, along with the event file(s) 212 including event data 210, data pertaining to operational parameters of the plurality of control systems included in the system 300 may also be required. In an example, such data pertaining to operational parameters of the plurality of control systems is included in an attribute file, such as attribute file 216. In such a case, the instructions 1010 causes the processor(s) 1002 to receive the attribute file 216 from the data processing system 312 of the OTN 202 over a unidirectional gateway, such as the unidirectional gateway 206. The unidirectional gateway 206 may be a data diode or any such circuitry which permits transmission of data from the OTN 202 to the ITN 204 but not vice-versa. The unidirectional gateway 206, such as a data diode, is capable of concealing various access related parameters or network information (e.g., IP or MAC addresses) of the systems within the OTN 202. Since such information is not available, any communication or access with systems within OTN 202 is not possible. In such a case, any system functioning within the ITN 204 will not be able to access or communicate with any other system within the OTN 202. Returning to the present example, in an example, the attribute file 216 is generated based on batch of attribute data 214 which is obtained by storing attribute data 214 pertaining to operational parameters of different control systems in the buffer until a predefined condition is not satisfied.

Once the event file(s) 212 and the attribute file 216 are received, the instructions 1010 cause the processor(s) 1002 to process the event file(s) 212 and the attribute file 216 to generate event related insights and metrics pertaining to the plurality of control systems which are installed within in the OTN 202, respectively. Such insights may be utilized for implementing desired alarm management solutions and features within the ITN 204. In an example, the event file(s) 212 may be processed by the processor(s) 1002 to provide event related insights for effecting management of events and alarms.

In the case of attribute file 216, the metrics pertaining to the plurality of control systems relate to data corresponding to operational parameters of control systems. For example, the attribute file 216 includes data indicating insights into the metrics pertaining to the distributed control systems and/or process safety systems within the system 300. In an example, the processor(s) 1002 may be configured to process the attribute file 216 to determine the proportion of alarms or other control functions which may be active. In another example, the metric insight may indicate the number of alarms that may be active for a given facility or for a given industrial process that is to be monitored.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

What is claimed is:

1. A system comprising:

a processor; and a machine-readable storage medium comprising instructions executable by the processor to:

continuously obtain event data of a plurality of control systems in an operational technology network of an industrial system from a data collection unit, wherein the event data comprises data corresponding to events occurring in the operational technology network;

generate an event file based on the obtained event data, wherein the event files comprises the event data obtained from each of the plurality of control systems in a structured format;

collect from the data collection unit, attribute data pertaining to operational parameters of the plurality of control systems in the operational technology network of the industrial system;

store the collected attribute data as a batched attribute data;

generate an attribute file based on the batched attribute data, wherein the attribute file comprises the attribute data corresponding to each of the plurality of control system in a structured format; and cause to transmit the event file and the attribute file through a unidirectional gateway to an information technology network, wherein the information technology network is coupled with the operational technology network through the unidirectional gateway, and wherein the unidirectional gateway is to permit transfer of data from the operational technology network to the information technology network and restricts transfer of the data from the information technology network to the operational technology network.

2. The system as claimed in claim 1, wherein the instructions are executable by the processor to further:

in response to determining that the stored attribute data conforms to a predefined condition, generate the attribute file based on the attribute data.

3. The system as claimed in claim 1, wherein the event file is generated at one of a predefined time instance and on obtaining a predefined volume of event data, or a combination thereof.

4. The system as claimed in claim 2, wherein the instructions are executable by the processor to further:

determine a tag associated with data corresponding to the plurality of control systems; and based on the tag, identifying the data as one of the event data and the attribute data.

5. The system as claimed in claim 1, wherein the event data is collected using a communication protocol comprising OPC alarm & event (OPC AE), OPC unified architecture alarms and conditions (OPC UA AC), open database connectivity (ODBC), transmission control protocol/internet protocol (TCP/IP), serial communication protocol, and file transfer protocol.

6. The system as claimed in claim 1, wherein the event data is obtained from a plurality of field sensors deployed at a facility being managed by the industrial control system, wherein each of the plurality of field sensors are communicatively coupled with any of the plurality of control systems.

7. The system as claimed in claim 1, wherein the instructions are executable by the processor to generate a subsequent event file chronologically based on subsequent obtaining of the event data.

8. The system as claimed in claim 1, wherein the unidirectional gateway is a data diode allowing transfer of files from operational technology network to the information technology network only.

* * * * *